(12) United States Patent
Mudric

(10) Patent No.: US 11,516,131 B2
(45) Date of Patent: Nov. 29, 2022

(54) LEAST COMMON SCOPE ADDRESS SELECTION SYSTEMS AND METHODS

(71) Applicant: Ciena Corporation, Hanover, MD (US)

(72) Inventor: Dusan Mudric, Ottawa (CA)

(73) Assignee: Ciena Corporation, Hanover, MD (US)

( * ) Notice: Subject to any disclaimer, the term of this patent is extended or adjusted under 35 U.S.C. 154(b) by 60 days.

(21) Appl. No.: 17/171,241

(22) Filed: Feb. 9, 2021

(65) Prior Publication Data

US 2022/0255860 A1 Aug. 11, 2022

(51) Int. Cl.
*G06F 15/16* (2006.01)
*H04L 45/74* (2022.01)

(52) U.S. Cl.
CPC .................................. *H04L 45/74* (2013.01)

(58) Field of Classification Search
CPC . H04L 45/74; H04L 41/0806; H04L 41/0895; H04L 45/38; H04L 45/66; H04L 45/26; H04L 45/308
USPC ......................................................... 370/392
See application file for complete search history.

(56) References Cited

U.S. PATENT DOCUMENTS

| | | | | |
|---|---|---|---|---|
| 8,285,850 B1* | 10/2012 | Jones | ...................... | H04L 47/22 709/227 |
| 11,245,617 B1* | 2/2022 | Bonica | ..................... | H04L 45/34 |
| 2004/0225750 A1* | 11/2004 | Lim | ......................... | H04L 61/58 709/245 |
| 2013/0279367 A1* | 10/2013 | Sarikaya | ................. | H04L 69/08 370/467 |
| 2016/0112315 A1* | 4/2016 | Tosaka | .................... | H04L 45/54 370/392 |
| 2018/0109447 A1* | 4/2018 | Mudric | ................. | H04L 67/148 |
| 2019/0245777 A1* | 8/2019 | Koshy | ................. | H04L 49/3009 |

FOREIGN PATENT DOCUMENTS

WO WO-2011025854 A1 * 3/2011 ........... H04L 45/742

OTHER PUBLICATIONS

Providing multi-homing support in IP access networks A. Mihailovic;G. Leijonhufvud;T. Suihko The 13th IEEE International Symposium on Personal, Indoor and Mobile Radio Communications Year: 2002 | vol. 2 | Conference Paper | Publisher: IEEE (Year: 2002).*
Mobile IPv6 security while traversing a NAT Geon-Woo Kim;Jong-Wook Han;Dong-II Seo The 11th IEEE International Conference on Networks, 2003. ICON2003. Year: 2003 | Conference Paper | Publisher: IEEE (Year: 2003).*

(Continued)

*Primary Examiner* — Oscar A Louie
*Assistant Examiner* — Oluwatosin M Gidado
(74) *Attorney, Agent, or Firm* — Clements Bernard Baratta; Lawrence A. Baratta, Jr.; Christopher L. Bernard

(57) ABSTRACT

Systems and methods include determining if a destination address for a destination host is on-link; when the destination address is on-link, negotiating and selecting a Link-Local (LL) source address and a LL destination address that is on-link; and, when the destination address is not on-link, utilizing an address for the destination host separate from LL addresses. The destination host can be a multi-homed host. The negotiating and selecting and the utilizing are based on a plurality of rules performed in order. The plurality of rules are defined in RFC 6724, September 2012.

15 Claims, 2 Drawing Sheets

(56) References Cited

OTHER PUBLICATIONS

D. Mudric et al., "Least-Common Scope Communications draft-mudric-6man-lcs-02", 6MAN Working Group,Internet-Draft, Intended status: Standards Track, Nov. 14, 2020, pp. 1-10.
R. Gilligan et al., "Basic Socket Interface Extensions for IPv6", Network Working Group, Category: Informational, The Internet Society, Mar. 1999, pp. 1-41.
S. Deering et al., "IPv6 Scoped Address Architecture", Network Working Group, Category: Standards Track, The Internet Society, Mar. 2005, pp. 1-24.
E. Nordmark et al., "Basic Transition Mechanisms for IPv6 Hosts and Routers", Network Working Group, Category: Standards Track, The Internet Society, Oct. 2005, pp. 1-27.
T. Narten et al., "Neighbor Discovery for IP version 6 (IPv6)", Network Working Group, Category: Standards Track, Sep. 2007, pp. 1-97.
F. Templin et al., "Intra-Site Automatic Tunnel Addressing Protocol (ISATAP)", Network Working Group, Category: Informational, Mar. 2008, pp. 1-15.
W. Townsley et al., "IPv6 Rapid Deployment on IPv4 Infrastructures (6rd)—Protocol Specification", Internet Engineering Task Force (IETF), Category: Standards Track, ISSN: 2070-1721, Aug. 2010, pp. 1-18.
D. Thaler et al., "Default Address Selection for Internet Protocol Version 6 (IPv6)", Internet Engineering Task Force (IETF), Category: Standards Track, ISSN: 2070-1721, Sep. 2012, pp. 1-32.
F. Baker et al., "First-Hop Router Selection by Hosts in a Multi-Prefix Network", Internet Engineering Task Force (IETF), Category: Standards Track, ISSN: 2070-1721, Nov. 2016, pp. 1-13.

\* cited by examiner

LEAST COMMON SCOPE ADDRESS SELECTION SYSTEMS AND METHODS

FIELD OF THE DISCLOSURE

The present disclosure generally relates to networking. More particularly, the present disclosure relates to Least Common Scope (LCS) address selection systems and methods.

BACKGROUND OF THE DISCLOSURE

RFC 4007, "IPv6 Scoped Address Architecture," March 2005, the contents of which are incorporated by reference in their entirety, describes address scope. Internet Protocol version 6 (IPv6) includes support for addresses of different "scope"; that is, both global and non-global (e.g., link-local (LL)) addresses. Every IPv6 address has a scope that specifies in which part of the network it is valid. For unicast addresses, two scopes are defined: link-local and global. Link-local addresses and the loopback address have a link-local scope, which means they can only be used on a single directly attached network (link). All other addresses (including Unique local addresses) have a global (or universal) scope, which means they are (or could be) globally routable and can be used to connect to addresses with global scope anywhere or to addresses with a link-local scope on the directly attached network. Packets with a source or destination in one scope cannot be routed to a different scope. Unique local addresses have global scope, but they are not globally administered. As a result, only other hosts in the same administrative domain (e.g., an organization) or within a cooperating administrative domain can reach such addresses if properly routed. As their scope is global, these addresses are valid as a source address when communicating with any other global-scope address, even though it may be impossible to route packets from the destination back to the source.

Each link and the interfaces attached to that link are a single zone of link-local scope (for both unicast and multicast). The boundaries of zones of a scope other than interface-local, link-local, and global must be defined and configured by network administrators. A node requires an internal means to identify to which zone a non-global address belongs. This is accomplished by assigning, within the node, a distinct "zone index" to each zone of the same scope to which that node is attached and by allowing all internal uses of an address to be qualified by a zone index.

RFC 6724, "Default Address Selection for Internet Protocol Version 6 (IPv6)," September 2012, the contents of which are incorporated by reference in their entirety, describes approaches for source address selection and one for destination address selection. Specifically, RFC 6724 includes a Source Address Selection Algorithm (SASA) in Section 5 and a Destination Address Selection Algorithm (DASA) in Section 6. The existing RFC 6724 address selection algorithms cannot select a correct LL address on multi-homed hosts, namely a host connected to more than one network.

BRIEF SUMMARY OF THE DISCLOSURE

The present disclosure relates to Least Common Scope (LCS) address selection systems and methods. The present disclosure allows hosts to select and use LL addresses when they communicate on the same local link. To be able to select LL addresses without address resolution message changes, the present disclosure proposes changing only DASA and SASA algorithms in RFC 6724. The present disclosure also proposes to change the socket Application Programming Interface (API) to allow a host to pass zone IDs for LL addresses or interface IDs for all addresses (group destination addresses in the list per interface).

In various embodiments, the present disclosure includes a method with steps, a host with various components configured to implement the steps, and a non-transitory computer-readable medium with instructions that cause one or more processors to perform the steps. The steps include determining if a destination address for a destination host is on-link; when the destination address is on-link, negotiating and selecting a Link-Local (LL) source address and a LL destination address that is on-link; and when the destination address is not on-link, utilizing an address for the destination host separate from LL addresses.

The destination host can be a multi-homed host. The steps can also include obtaining destination addresses for the destination host including LL addresses and Global Unicast Addresses (GUA). The negotiating and selecting and the utilizing can be based on a plurality of rules performed in order. The plurality of rules can be for a Source Address Selection Algorithm and a Destination Address Selection Algorithm. The plurality of rules can include, in a Destination Address Selection Algorithm, preferring an on-link destination address over a not on-link destination address. The plurality of rules can include, in a Destination Address Selection Algorithm, preferring a destination LL address if a selected Global Unicast Address (GUA) in on-link. The plurality of rules can include, in a Destination Address Selection Algorithm, selecting a destination LL address with a same zone identifier as the source LL address. The plurality of rules can be defined in RFC 6724, September 2012.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Figure 1:
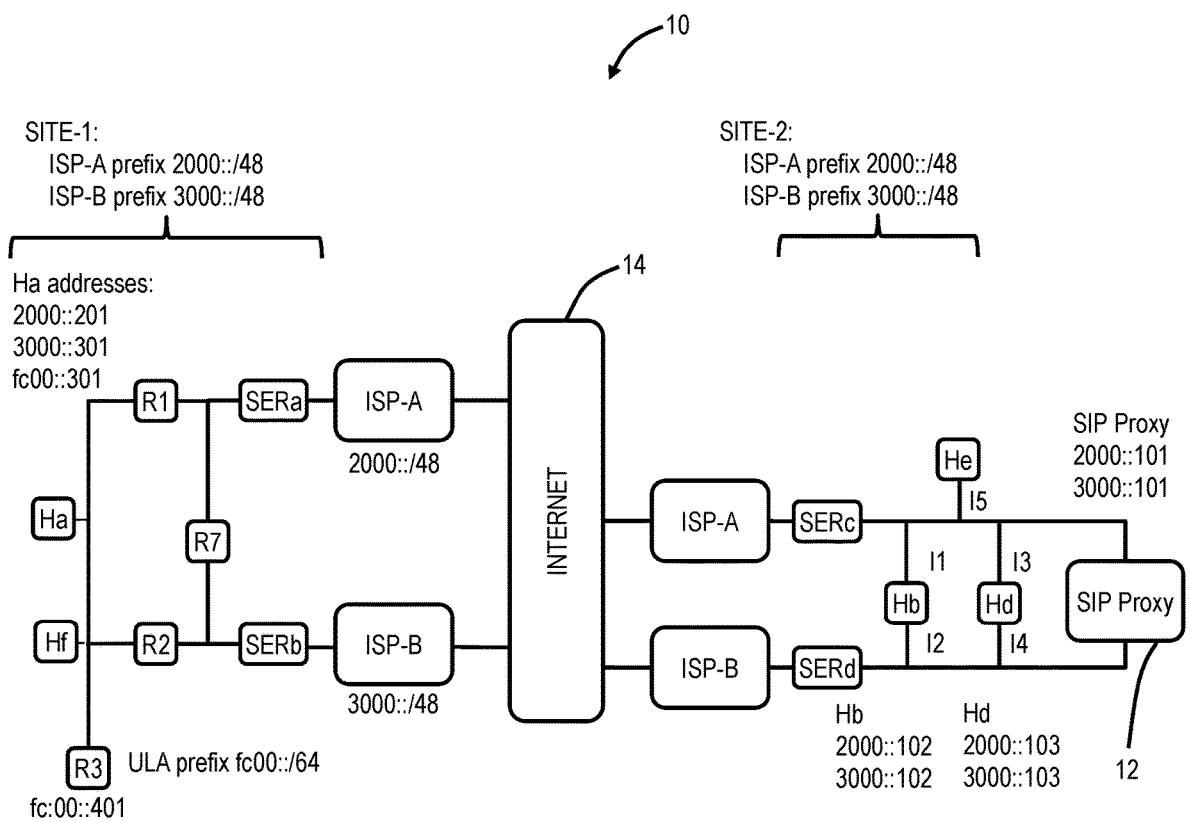
FIG. 1 is a network diagram of Session Initiation Protocol version 6 (SIPv6) Link-Local (LL) address selection impact on multi-homed hosts and proxy.

Again, the present disclosure relates to Least Common Scope (LCS) address selection systems and methods. The present disclosure allows hosts to select and use LL addresses when they communicate on the same local link. To be able to select LL addresses without address resolution message changes, the present disclosure proposes changing only DASA and SASA algorithms in RFC 6724. The present disclosure also proposes to change the socket Application Programming Interface (API) to allow a host to pass zone IDs for LL addresses or interface IDs for all addresses (group destination addresses in the list per interface).

RFC 6724—Overview

RFC 6724 includes algorithms specified as a set of rules that define a partial ordering on the set of addresses that are available for use. In the case of source address selection, a node typically has multiple addresses assigned to its interfaces, and the source address ordering rules in Section 5 define which address is the "best" one to use. In the case of destination address selection, the Domain Name System (DNS) might return a set of addresses for a given name or Session Description Protocol (SDP) offer that might provide a list of offerer's addresses from which an answerer needs to select one as a destination, and an application needs to decide which one to use first and in what order to try others if the first one is not reachable. The destination address ordering rules in Section 6, when applied to the set of addresses returned by the DNS, provide such a recommended ordering. For example, an SDP offer in a SIP session INVITE might provide a list of offerer's addresses from which an answered needs to select one as the destination.

RFC 6724—Section 5—Source Address Selection (SASA)

The source address selection algorithm produces as output a single source address for use with a given destination address. The algorithm is specified here in terms of a list of pair-wise comparison rules that (for a given destination address D) imposes a "greater than" ordering on the addresses in the candidate set CandidateSource(D). The address at the front of the list after the algorithm completes is the one the algorithm selects.

Note that conceptually, a sort of the candidate set is being performed, where a set of rules define the ordering among addresses. But because the output of the algorithm is a single source address, an implementation need not actually sort the set; it need only identify the "maximum" value that ends up at the front of the sorted list.

The ordering of the addresses in the candidate set is defined by a list of eight pair-wise comparison rules, with each rule placing a "greater than," "less than," or "equal to" ordering on two source addresses with respect to each other (and that rule). In the case that a given rule produces a tie, i.e., provides an "equal to" result for the two addresses, the remaining rules MUST be applied (in order) to just those addresses that are tied to break the tie. Note that if a rule produces a single clear "winner" (or set of "winners" in the case of ties), those addresses not in the winning set can be discarded from further consideration, with subsequent rules applied only to the remaining addresses. If the eight rules fail to choose a single address, the tiebreaker is implementation-specific.

When comparing two addresses SA and SB from the candidate set, we say "prefer SA" to mean that SA is "greater than" SB, and similarly, we say "prefer SB" to mean that SA is "less than" SB. If neither is stated to be preferred, this means that SA is "equal to" SB, and the remaining rules apply as noted above.

Rule 1: Prefer same address. If SA=D, then prefer SA. Similarly, if SB=D, then prefer SB.

Rule 2: Prefer appropriate scope. If Scope(SA)<Scope(SB): If Scope(SA)<Scope(D), then prefer SB and otherwise prefer SA. Similarly, if Scope(SB)<Scope(SA): If Scope(SB)<Scope(D), then prefer SA and otherwise prefer SB. This rule must be given high priority because it can affect interoperability.

Rule 3: Avoid deprecated addresses. If one of the two source addresses is "preferred" and one of them is "deprecated" (in the RFC 4862 sense), then prefer the one that is "preferred."

Rule 4: Prefer home addresses. If SA is simultaneously a home address and care-of address and SB is not, then prefer SA. Similarly, if SB is simultaneously a home address and care-of address and SA is not, then prefer SB. If SA is just a home address and SB is just a care-of address, then prefer SA. Similarly, if SB is just a home address and SA is just a care-of address, then prefer SB.

Rule 5: Prefer outgoing interface. If SA is assigned to the interface that will be used to send to D and SB is assigned to a different interface, then prefer SA. Similarly, if SB is assigned to the interface that will be used to send to D and SA is assigned to a different interface, then prefer SB.

Rule 5.5: Prefer addresses in a prefix advertised by the next-hop. If SA or SA's prefix is assigned by the selected next-hop that will be used to send to D and SB or SB's prefix is assigned by a different next-hop, then prefer SA. Similarly, if SB or SB's prefix is assigned by the next-hop that will be used to send to D and SA or SA's prefix is assigned by a different next-hop, then prefer SB.

Rule 6: Prefer matching label. If Label(SA)=Label(D) and Label(SB)< >Label(D), then prefer SA. Similarly, if Label(SB)=Label(D) and Label(SA)< >Label(D), then prefer SB.

Rule 7: Prefer temporary addresses. If SA is a temporary address and SB is a public address, then prefer SA. Similarly, if SB is a temporary address and SA is a public address, then prefer SB.

Rule 8: Use longest matching prefix. If CommonPrefixLen(SA, D)>CommonPrefixLen(SB, D), then prefer SA. Similarly, if CommonPrefixLen(SB, D)>CommonPrefixLen(SA, D), then prefer SB. Rule 8 MAY be superseded if the implementation has other means of choosing among source addresses. For example, if the implementation somehow knows which source address will result in the "best" communications performance.

RFC 6724—Section 6—Destination Address Selection (DASA)

The destination address selection algorithm takes a list of destination addresses and sorts the addresses to produce a new list. It is specified here in terms of the pair-wise comparison of addresses DA and DB, where DA appears before DB in the original list. The algorithm sorts together both IPv6 and IPv4 addresses. To find the attributes of an IPv4 address in the policy table, the IPv4 address MUST be represented as an IPv4-mapped address.

We write Source(D) to indicate the selected source address for a destination D. For IPv6 addresses, the previous section specifies the source address selection algorithm. We say that Source(D) is undefined if there is no source address available for destination D. For IPv6 addresses, this is only the case if CandidateSource(D) is the empty set.

The pair-wise comparison of destination addresses consists of ten rules, which MUST be applied in order. If a rule determines a result, then the remaining rules are not relevant and MUST be ignored. Subsequent rules act as tiebreakers for earlier rules. See the previous section for a lengthier description of how pair-wise comparison tiebreaker rules can be used to sort a list.

Rule 1: Avoid unusable destinations. If DB is known to be unreachable or if Source(DB) is undefined, then prefer DA. Similarly, if DA is known to be unreachable or if Source(DA) is undefined, then prefer DB. Discussion: An implementation might know that a particular destination is unreachable in several ways. For example, the destination might be reached through a network interface that is currently unplugged. For example, the implementation might retain information from Neighbor Unreachability Detection [RFC 4861, "Neighbor Discovery for IP version 6 (IPv6)," September 2007, the contents of which are incorporated by reference in their entirety] for some period of time. In any case, the determination of unreachability for the purposes of this rule is implementation-dependent.

Rule 2: Prefer matching scope. If Scope(DA)=Scope(Source(DA)) and Scope(DB)< >Scope(Source(DB)), then prefer DA. Similarly, if Scope(DA)< >Scope(Source(DA)) and Scope(DB)=Scope(Source(DB)), then prefer DB.

Rule 3: Avoid deprecated addresses. If Source(DA) is deprecated and Source(DB) is not, then prefer DB. Similarly, if Source(DA) is not deprecated and Source(DB) is deprecated, then prefer DA.

Rule 4: Prefer home addresses. If Source(DA) is simultaneously a home address and care-of address and Source (DB) is not, then prefer DA. Similarly, if Source(DB) is simultaneously a home address and care-of address and Source(DA) is not, then prefer DB. If Source(DA) is just a home address and Source(DB) is just a care-of address, then prefer DA. Similarly, if Source(DA) is just a care-of address and Source(DB) is just a home address, then prefer DB.

Rule 5: Prefer matching label. If Label(Source(DA))=Label(DA) and Label(Source(DB))< >Label(DB), then prefer DA. Similarly, if Label(Source(DA))< >Label(DA) and Label(Source(DB))=Label(DB), then prefer DB.

Rule 6: Prefer higher precedence. If Precedence(DA)>Precedence(DB), then prefer DA. Similarly, if Precedence(DA)<Precedence(DB), then prefer DB.

Rule 7: Prefer native transport. If DA is reached via an encapsulating transition mechanism (e.g., IPv6 in IPv4) and DB is not, then prefer DB. Similarly, if DB is reached via encapsulation and DA is not, then prefer DA. Discussion: The IPv6 Rapid Deployment on IPv4 Infrastructures(6rd) Protocol [RFC5969], the Intra-Site Automatic Tunnel Addressing Protocol (ISATAP) [RFC5214], and configured tunnels [RFC4213] are examples of encapsulating transition mechanisms for which the destination address does not have a specific prefix and hence cannot be assigned a lower precedence in the policy table.

Rule 8: Prefer smaller scope. If Scope(DA)<Scope(DB), then prefer DA. Similarly, if Scope(DA)>Scope(DB), then prefer DB.

Rule 9: Use longest matching prefix. When DA and DB belong to the same address family (both are IPv6 or both are IPv4): If CommonPrefixLen(Source(DA), DA)>CommonPrefixLen(Source(DB), DB), then prefer DA. Similarly, if CommonPrefixLen(Source(DA), DA)<CommonPrefixLen(Source(DB), DB), then prefer DB.

Rule 10: Otherwise, leave the order unchanged. If DA preceded DB in the original list, prefer DA. Otherwise, prefer DB.

Problem Statement

FIG. 1 is a network diagram of Session Initiation Protocol version 6 (SIPv6) Link-Local (LL) address selection impact on multi-homed hosts and proxy in a network 10. To be globally reachable, hosts use GUAs, Global Unicast Addresses, for their sockets. That exposes them to attacks. In the example of FIG. 1, a SIP proxy 12 is at a site-2 that is connected to a site-1 via the Internet 14. There are two networks, ISP-A and ISP-B, where ISP is an Internet Service Provider, that interconnect the two sites site-1, site-2. The site-1 connects to the ISP-A via a SERa where SER is a Service Edge Router and to the ISP-B via a SERb. The site-2 connects to the ISP-A via a SERc and the ISP-B via a SERd. The site-2 includes various SIP hosts Hb, Hd, He that connect to the SIP proxy 12. The SIP hosts Hb, Hd, He include interfaces I1, I2, I3, I4, I5. Specifically, the SIP host Hb includes interface I1, I2 that connect to the SERc, SERd, respectively, and to the ISP-A, ISP-B, respectively. The SIP host Hd includes interface I3, I4 that connect to the SERc, SERd, respectively, and to the ISP-A, ISP-B, respectively. Finally, the SIP host He includes interface I4 that connects to the SERc and the ISP-A. Thus, the SIP hosts Hb, Hd are multi-homed hosts. The site-1 includes various routers R1, R2, R3, R7 that connect SIP hosts Ha, Hf to the SERa, SERb and the ISP-A, ISP-B.

For illustration purposes, the ISP-A includes a prefix of 2000::/48 and the ISP-B includes a prefix of 3000::/48. The router R3 includes a Unique Local Address (ULA) prefix of fc00::/64. The SIP host Ha includes addresses of 2000::201, 3000::301, fc00::301. The SIP proxy 12 includes addresses of 2000::101, 3000::101. The SIP host Hb includes addresses of 2000::102, 3000::102, and the SIP host Hd includes addresses of 2000::103, 3000::103.

For example, SIP hosts Hb, Hd in FIG. 1 register their GUAs with the SIP Proxy 12 and can be reached via the SIP Proxy 12, during SIP signaling, by SIP host Ha. The SIP hosts Hb, Hd need to open a socket and listen to the SIP host Ha on a global address, which can be attacked. If the SIP host Hb, Hd talk, they can use a Link Local (LL) address, to avoid this kind of attack.

Destination addresses are provided by an application (e.g., SIP), including LL addresses. In this case, a destination LL is known by a host initiating a media session and doing DASA address selection, unlike in "Least-Common Scope Communications," draft-mudric-6man-lcs-02, available online at tools.ietforg/html/draft-mudric-6man-lcs-02, the contents of which are incorporated by reference in their entirety, where the destination LL is not known and needs to be obtained from the on-link destination host.

On-link means addresses can be resolved locally and do not need a gateway because they do not need to be routed.

Those of ordinary skill in the art will recognize FIG. 1 is presented for illustration purposes. That is, the network 10 and the use of the SIP proxy 12 are illustrated to show the problems involved for correct LL address selection on multi-homed hosts and the solutions proposed herein. Those skilled in the art will recognize the Least Common Scope (LCS) address selection systems and methods described herein can apply to other networks, other protocols besides SIP, etc.

Multi-Homed Setup Issues

Existing RFC 6724 algorithms cannot select a correct LL address on multi-homed hosts, such as the SIP hosts Hb, Hd. Multiple LL addresses are on multiple interfaces and some might not be attached to the source. For example, SIP host He interface I5 (He-I5) is not on the same link as SIP host Hb interface I2 (Hb-LL-I2). He-I5 cannot reach Hb-LL-I2. If an application provides a list of all the SIP host Hb's addresses to the SIP host He, the SIP host He will not be able to select a correct on-link Hb-LL address, using existing the RFC 6724 DASA (Destination Address Selection) and SASA (Source Address Selection) algorithms. Or, if the SIP host Hb talks to the SIP host Hd, and gets all of the SIP host Hd's addresses, destination LL addresses are preferred but there is no policy to select one from a preferred interface (Hd-I3 interface using 2000::/64 prefix from preferred ISP-A). If a destination Hd LL is selected with the current SASA algorithm, the SIP host Hb might select a wrong destination LL, from an off-link interface, like Hd-LL-I4 address, and a connection between Hb-LL-I1 and Hd-LL-I4 would fail.

Given GUA and LL destination addresses (e.g., Hd addresses), the SIP host He DASA selects LL destination address (section 10.2, for example), based on the smaller scope, DASA rule 8. If there are multiple LL destination addresses (e.g., Hd LL-I3 and LL-I4), DASA does not have a rule to select on-link LL destination address. A wrong destination LL address might be selected by the SIP hosts He and the SIP host Hd becomes unreachable.

RFC 8028, "First-Hop Router Selection by Hosts in a Multi-Prefix Network," November 2016, the contents of which are incorporated by reference in their entirety, defines a first hop selection based on a source address selection, using the source address prefix to select the first hope router and outgoing interface. See also RFC 4861 Appendix A-1. This is not possible if a LL address is selected, since the LL address does not have a subnet prefix, used to find the first hop router and outgoing interface. RFC 6724 defines LL preference for DASA, but the source LL address selection cannot be used for the first hop and outgoing link selection.

The DASA policy table can be changed to select a destination GUA before a LL address. The host Hb can select a destination GUA (e.g., Hd 2000::103) to be used to select a SASA address (e.g., Hb 2000::102) and the outgoing interface (e.g., SASA Rule 5 will select I1 and Hb 2000:: 102). The problem is that DASA and SASA do not select link Local addresses, destination Hd-LL-I3 and source Hb-LL-I1, if a destination (e.g., Hd GUA) is on-link.

If multiple destination LLs are given to the DASA (e.g., Hd LL addresses on multiple links), and GUAs are used during address selections, there is no reference in the destination and source GUAs to the LLs on the same link.

Figure 2:
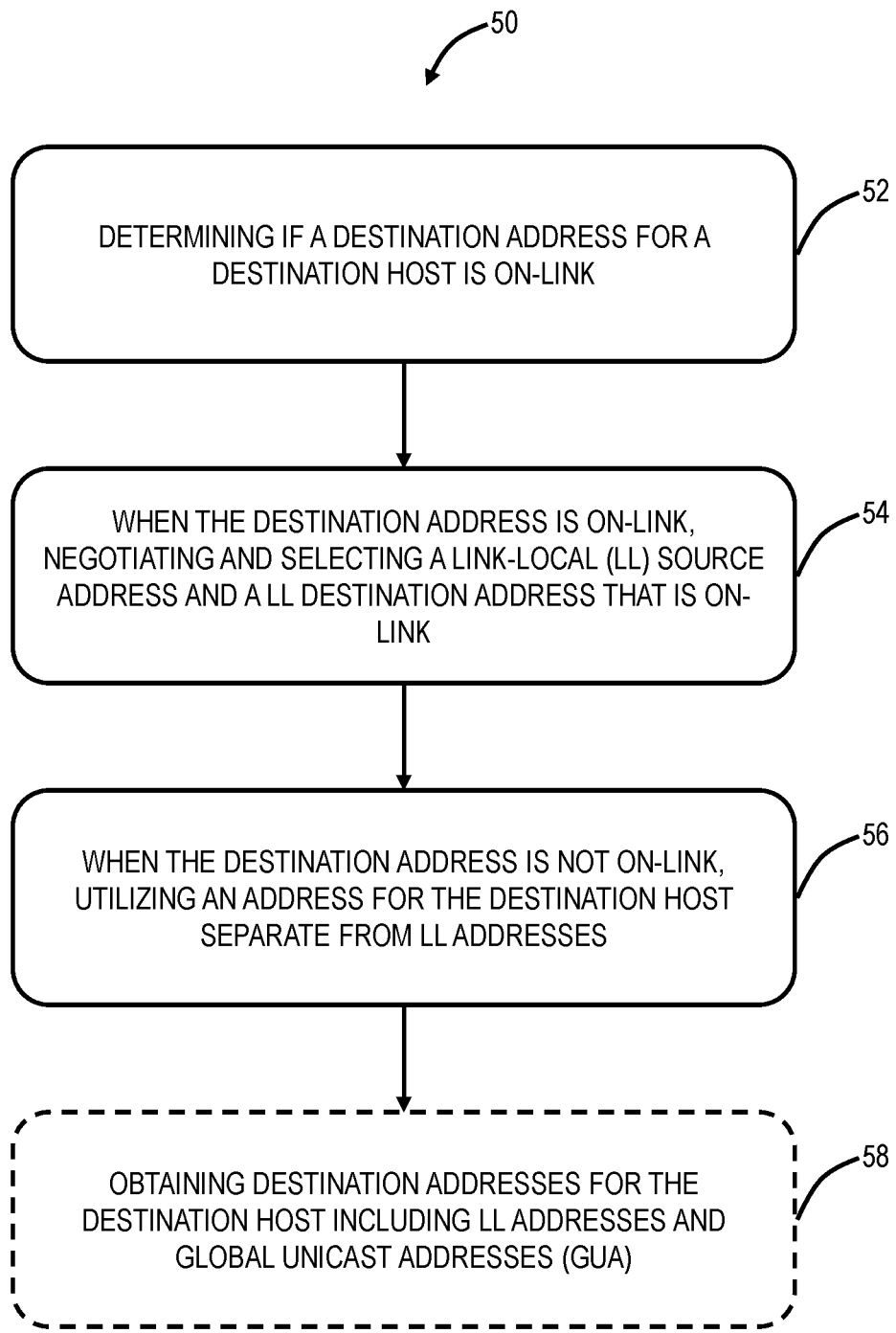
FIG. 2 is a flowchart of a process for address selection to address the aforementioned problems for IPv6 LL address selection impact on multi-homed hosts and proxy.

RFC 6724 has another problem with DASA Rule 8. Given the destination address list with LL addresses, it will select a LL address, without checking if the address is on the local link. If the host Ha sends its address list to the host He, the host He will select Ha a-LL address and will not be able to reach the host Ha because LL addresses are not routable.
Solution FIG. 2 is a flowchart of a process 50 for address selection to address the aforementioned problems for IPv6 LL address selection impact on multi-homed hosts and proxy. The process 50 allows hosts to select and use LL addresses when they communicate on the same local link. To be able to select LL addresses without address resolution message changes, the present disclosure proposes changing only DASA and SASA algorithms in RFC 6724. The present disclosure also proposed to change the socket API to allow a host to pass zone IDs for LL addresses or interface IDs for all addresses (group destination addresses in the list per interface).

The process 50 contemplates implementation as a method including steps, as a host configured to perform the steps, and as instructions stored on a non-transitory computer-readable medium for programming a host to perform the steps. The host can be any of the SIP hosts Ha, Hb, Hd, He, Hf or the SIP proxy. Also, the host can be a multi-homed host. A host can include one or more network interfaces, one or more processors, and memory with instructions that, when executed, cause the one or more processors to perform the steps.

The steps include determining if a destination address for a destination host is on-link (step 52); when the destination address is on-link, negotiating and selecting a Link-Local (LL) source address and a LL destination address that is on-link (step 54); and, when the destination address is not on-link, utilizing an address for the destination host separate from LL addresses (step 56). The steps can further include obtaining destination addresses for the destination host including LL addresses and Global Unicast Addresses (GUA) (step 58).

The negotiating and selecting and the utilizing can be based on a plurality of rules performed in order. The plurality of rules are for a Source Address Selection Algorithm and a Destination Address Selection Algorithm. The plurality of rules can include, in a Destination Address Selection Algorithm, preferring an on-link destination address over a not on-link destination address. The plurality of rules can include, in a Destination Address Selection Algorithm, preferring a destination LL address if a selected Global Unicast Address (GUA) in on-link. The plurality of rules can include, in a Destination Address Selection Algorithm, selecting a destination LL address with a same zone identifier. The plurality of rules can be defined in RFC 6724, September 2012.

The process 50 includes checking first if a destination address is on-link. If a destination is on-link, a host negotiates and selects a source LL address and a destination LL address. Otherwise, the host does not use LL addresses. Destination address are provided by an application (e.g., SIP), including LL addresses (e.g., the host Hb registers all of its addresses: GUAs and LLs and provides them in SIP INVITE SDP protocol). In this case a destination LL is known by a host initiating signaling or media and doing address selections, unlike tools.ietf.org/html/draft-mudric-6man-lcs-02.

Host: Sender Requirements—Solution 1

First, a DASA policy table can be changed to select a destination GUA before a LL addresses. A list of addresses to a destination can be provided to the DASA, grouping them per link. A rule can be added to the DASA to prefer a destination LL address, if the selected GUA is on-link.

A destination GUA can be used to select a source address. A rule 5.1 can be added to the SASA to select an outgoing interface for a selected source GUA (for a selected destination GUA) and find a LL address on the same interface.

As a result, a sender can select source and destination LLs for on-link destination, when the destination host is multi-homed.

Host: Sender Requirements—Solution 2

A destination LL can be used for a source LL selection (prefer a smallest scope). An outgoing interface is selected for a LL destination address on the same link (using a zone index—RFC 6724, section 4), without on link messages, using existing algorithms and data, like on-link prefixes.

Solution 3 (Off-Link Reachability)

The present disclosure includes checking if the address is on-link first, and the LL address is not used if it is not on-link. A preference for on-link rule can be programmable. There might be cases where it is not preferred to use on-link destinations.

Socket API Changes

RFC 2553, "Basic Socket Interface Extensions for IPv6," March 1999, and RFC 3493, "Basic Socket Interface Extensions for IPv6," February 2003, the contents of each are incorporated by reference in their entirety, describe APIs for applications, e.g., Transmission Control Protocol (TCP)/Internet Protocol (IP) applications such as SIP.

The present disclosure includes updates such that an application should provide a list of all destination addresses, where LL addresses need Zone IDs, to be able to determine the link they are on. Alternatively, an application should group addresses per interface, so if a GUA is selected, the LL address on the same interface can be known.

A socket should be bound to a LL zone and all hosts on-link should get the same zone identifier (ID). Alternatively, destination IP addresses should be grouped per link.

RFC 6724 Changes

DASA: add a rule to prefer on-link destination addresses (prefer D-GUA-on-link over D-GUA-not-on-link).

DASA: add a rule to prefer a destination LL, if the selected GUA is on-link.

DASA: add a rule to select destination LL with the same Zone (link) ID.

DASA: when the destination address is not on-link, utilizing addresses from the destination address separate from LL addresses.

SASA: add a rule 5.1 to prefer LL on the interface to on-link destination.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, host, one or more processors, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

As described herein, a host is a processing device with one or more processors with network interfaces connected to one or more network. A multi-homed host is one that includes the network interfaces being connected to a plurality of networks.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A host comprising:
one or more network interfaces, one or more processors, and memory comprising instructions that, when executed, cause the one or more processors to
determine if a destination address for a destination host is on-link;
when the destination address is on-link, negotiate and select a Link-Local (LL) source address and a LL destination address that is on-link based on utilization of a plurality of rules; and
when the destination address is not on-link, utilize an address for the destination host separate from LL addresses,
wherein the plurality of rules include in a Destination Address Selection Algorithm any of
preferring an on-link destination address over a not on-link destination address,
preferring a destination LL address if a selected Global Unicast Address (GUA) in on-link, and
selecting a destination LL address with a same zone identifier as the source LL address.

2. The host of claim 1, wherein the destination host is a multi-homed host.

3. The host of claim 1, wherein the instructions that, when executed, cause the one or more processors to
obtain destination addresses for the destination host including LL addresses and Global Unicast Addresses (GUA).

4. The host of claim 1, wherein the plurality of rules are for a Source Address Selection Algorithm and the Destination Address Selection Algorithm.

5. The host of claim 1, wherein the plurality of rules are defined in RFC 6724, September 2012.

6. A non-transitory computer-readable medium having instructions stored thereon for programming a host to perform steps of:
determining if a destination address for a destination host is on-link;
when the destination address is on-link, negotiating and selecting a Link-Local (LL) source address and a LL destination address that is on-link based on utilization of a plurality of rules; and
when the destination address is not on-link, utilizing an address for the destination host separate from LL addresses,
wherein the plurality of rules include in a Destination Address Selection Algorithm any of
preferring an on-link destination address over a not on-link destination address,
preferring a destination LL address if a selected Global Unicast Address (GUA) in on-link, and
selecting a destination LL address with a same zone identifier as the source LL addresses.

7. The non-transitory computer-readable medium of claim 6, wherein the destination host is a multi-homed host.

8. The non-transitory computer-readable medium of claim 6, wherein the steps include
obtaining destination addresses for the destination host including LL addresses and Global Unicast Addresses (GUA).

9. The non-transitory computer-readable medium of claim 6, wherein the plurality of rules are for a Source Address Selection Algorithm and the Destination Address Selection Algorithm.

10. The non-transitory computer-readable medium of claim 6, wherein the plurality of rules are defined in RFC 6724, September 2012.

11. A method comprising:
determining if a destination address for a destination host is or-link;
when the destination address is on-ink, negotiating and selecting a Link-Local (LL) source address and a LL destination address that is on-link based on utilization of a plurality of rules; and
when the destination address is not on-link, utilizing an address for the destination host separate from LL addresses,
wherein the plurality of rules include in a Destination Address Selection Algorithm any of
preferring an on-link destination address over a not on-link destination address,
preferring a destination LL address if a selected Global Unicast Address (GUA) in on-link, and
selecting a destination LL address with a same zone identifier as the source LL address.

12. The method of claim 11, further comprising
obtaining destination addresses for the destination host including LL addresses and Global Unicast Addresses (GUA).

13. The method of claim 11, wherein the destination host is a multi-homed host.

14. The method of claim 11, wherein the plurality of rules are for a Source Address Selection Algorithm and the Destination Address Selection Algorithm.

15. The method of claim 11, wherein the plurality of rules are defined in RFC 6724, September 2012.

* * * * *